Patented Jan. 26, 1937

2,068,970

UNITED STATES PATENT OFFICE 2,068,970

RECTIFYING SYSTEM

Harold Winograd, Milwaukee, Wis., assignor to Allis-Chalmers Manufacturing Company, Milwaukee, Wis., a corporation of Delaware Application August 7, 1933, Serial No. 683,939

17 Claims. (Cl. 175—363)

This invention relates to regulating systems and more particularly to a system for gradually initiating the flow of current in an electric current consuming circuit.

In electric systems comprising current generating, converting or consuming means, a sudden establishment of a flow of current therethrough at full load value is not generally permissible but such establishment must be effected gradually to avoid operating troubles of a nature dependent upon the nature of the means employed in the system. For instance, the flow of current through a direct current generator supplying current to electrolytic cells must be progressively established to avoid sparking at the commutator of the generator and also to permit the cells to become gradually polarized. The current flowing through electric motors must also be limited at starting by suitable means until the counter-electromotive force of the motor becomes sufficient to maintain the current within the permissible limits. When the flow of current occurs through an electron discharge device, during the starting period the device is generally not at the most favorable conditions of pressure, temperature and ionization required for the trouble-free flow of full load current therethrough. The current must therefore be established gradually in time and, in addition, it is also advantageous to regulate the flow of current during normal operation in response to conditions other than time or electrical conditions, such as conditions of pressure and temperature.

It is therefore among the objects of the present invention to provide a system for controlling the flow of current through current conducting means in response to conditions other than electrical conditions of such means.

Another object of the present invention is to provide a system for progressively increasing the flow of current through current conducting means after initiation of such flow of current.

Another object of the present invention is to provide a system for progressively establishing the flow of current through an electron discharge device.

Another object of the present invention is to provide a system for regulating the flow of current through an electron discharge device in response to the pressure conditions within such device.

Another object of the present invention is to provide a system for regulating the flow of current through an electron discharge device in response to temperature conditions of such device.

Figure 1:
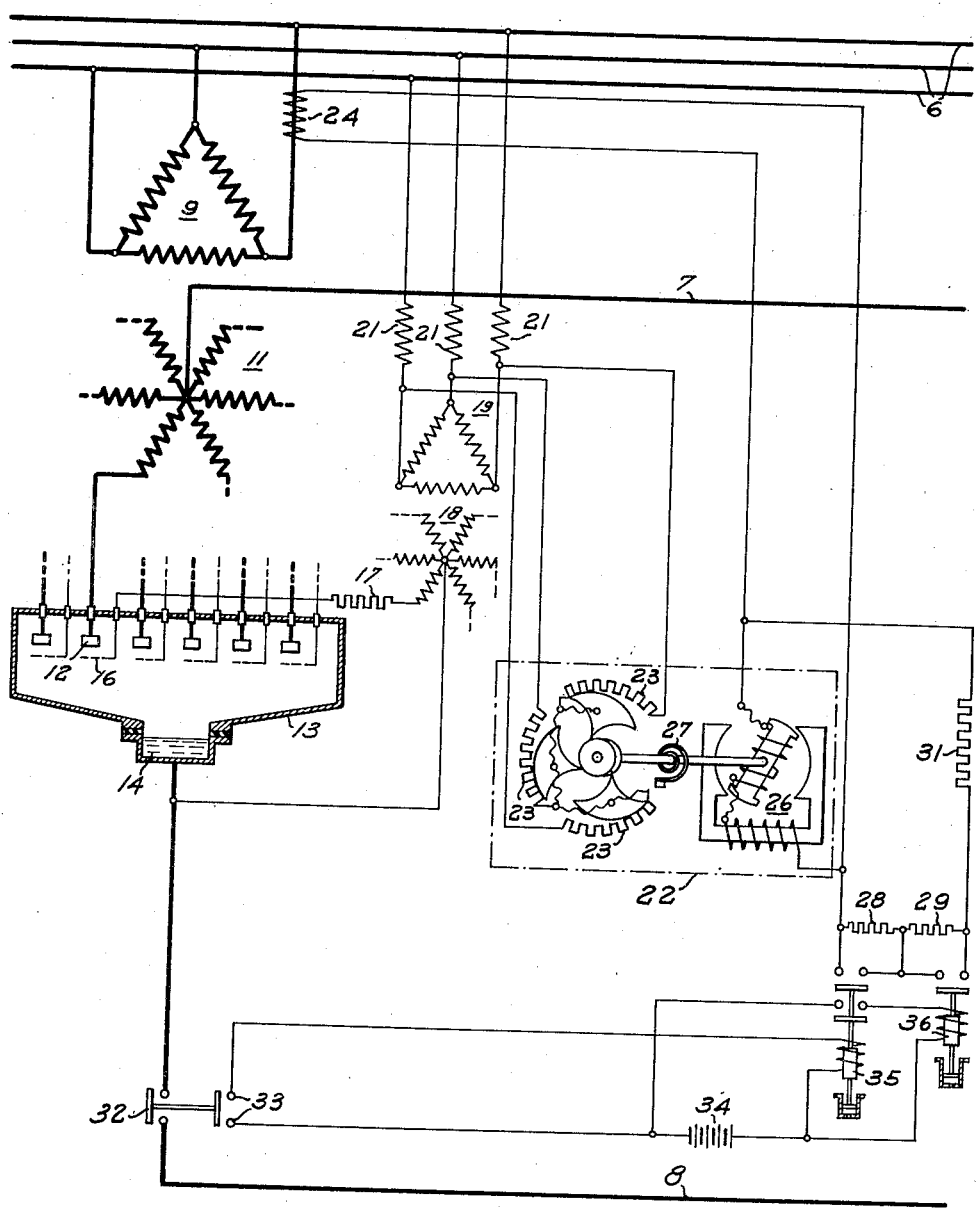
Figure 2:
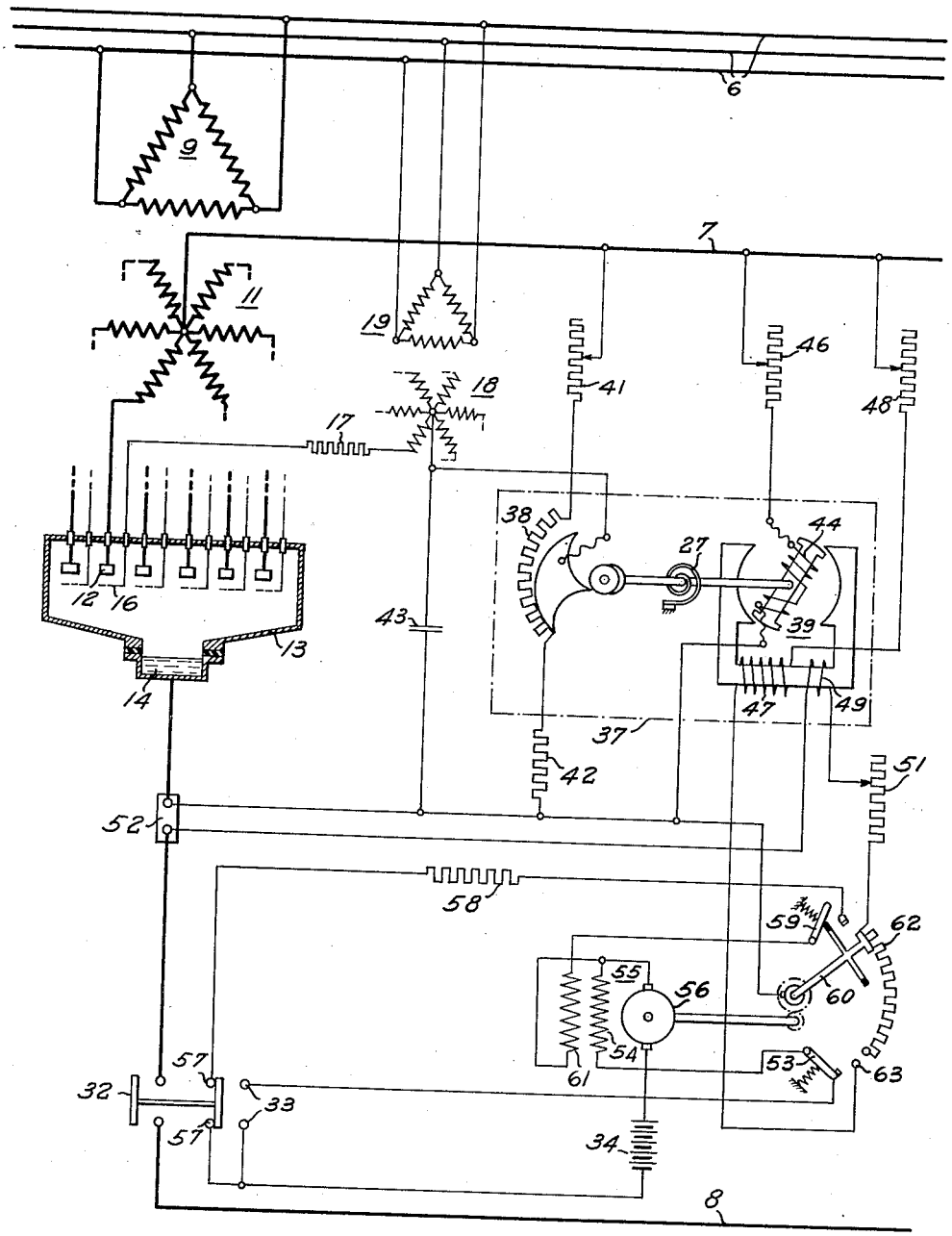
Figure 3:
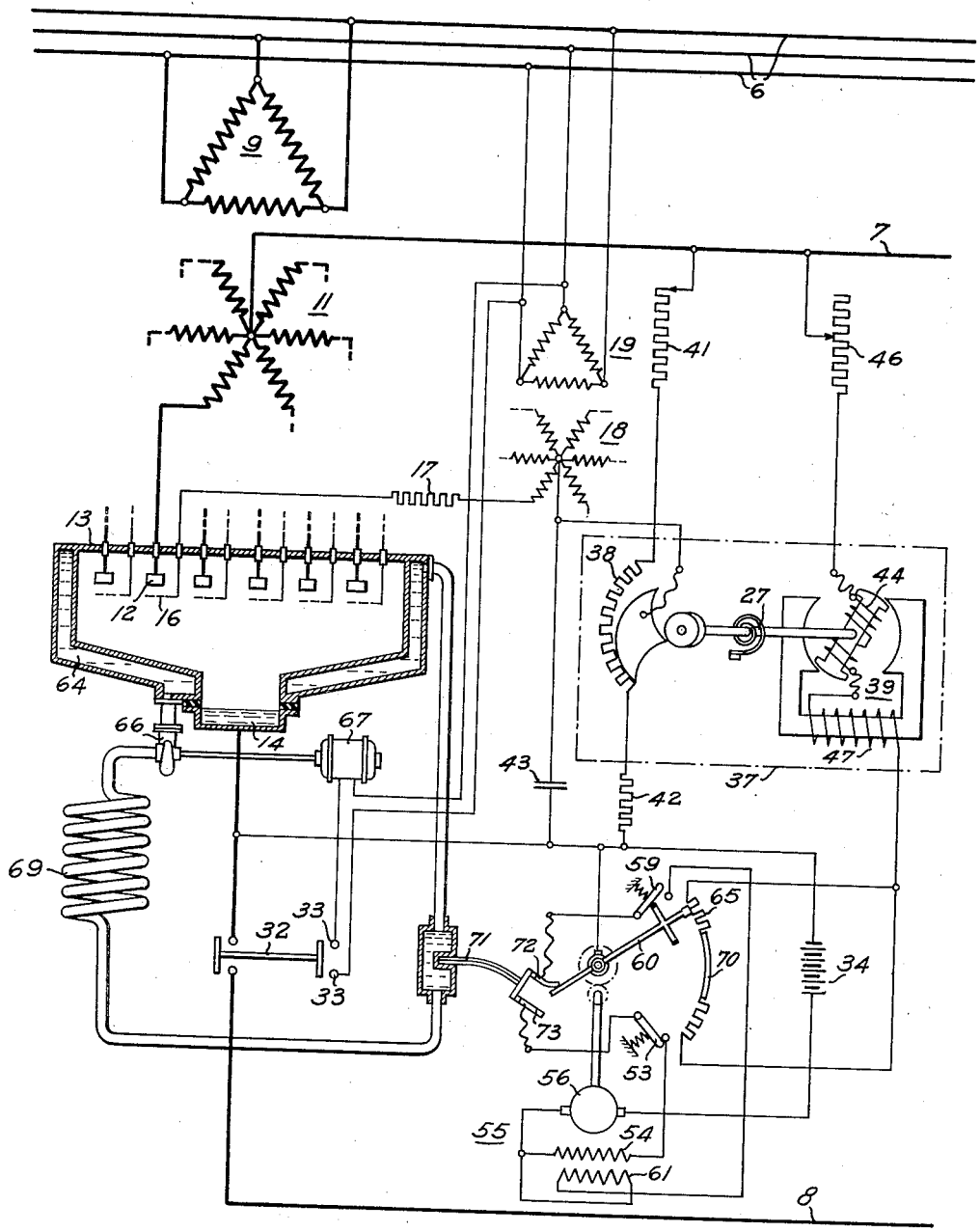
Figure 4:
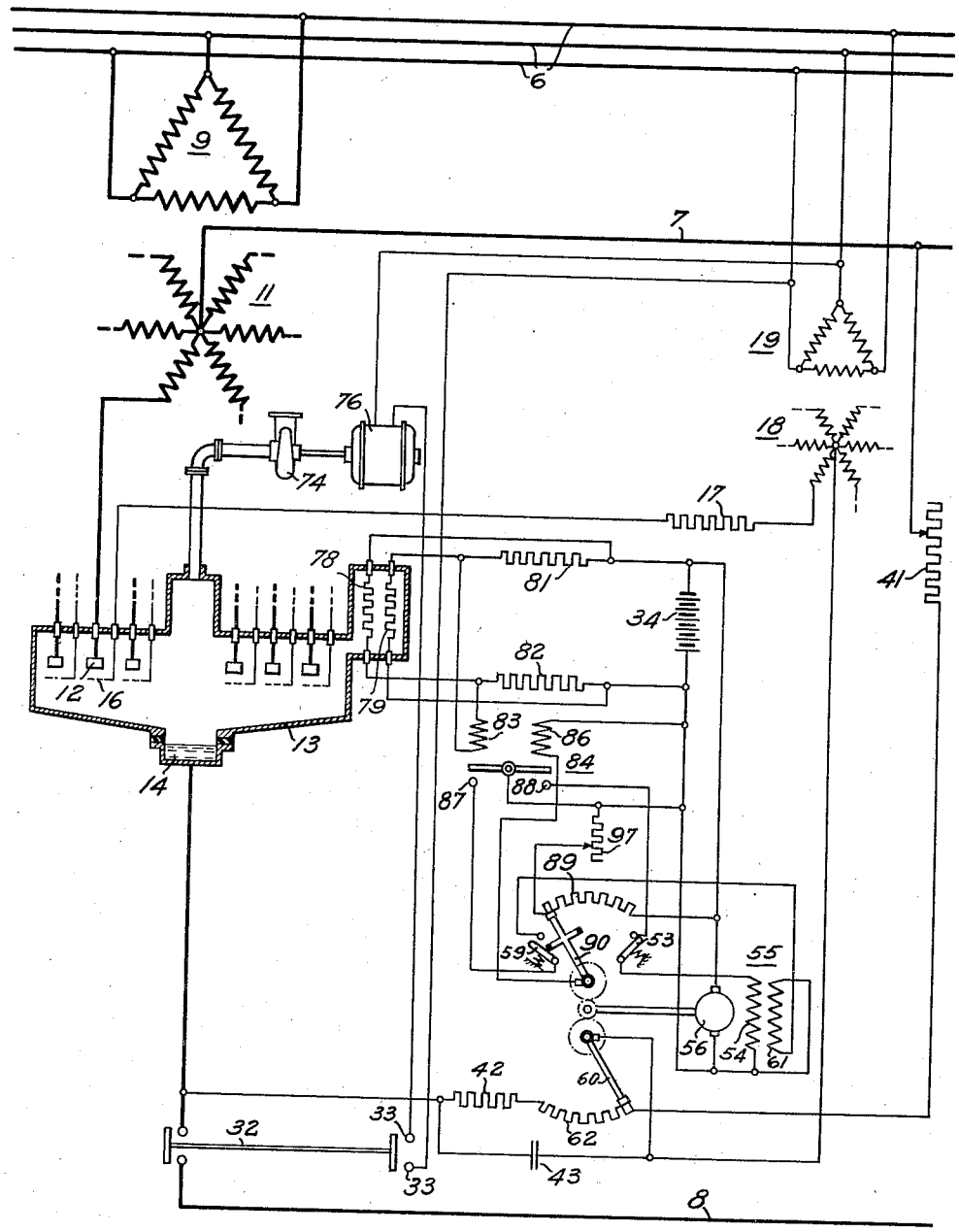

Objects and advantages other than those above set forth will be apparent from the following description when read in connection with the accompanying drawings, in which:

Fig. 1 diagrammatically illustrates one embodiment of the present invention applied to the control of an electric current rectifier in which a constant flow of current is automatically established in stepwise manner;

Fig. 2 diagrammatically illustrates a modified embodiment of the present invention in which the flow of current is first gradually established and is thereafter maintained at constant voltage during normal operation of the rectifier;

Fig. 3 diagrammatically illustrates another modified embodiment of the present invention in which the flow of current is both gradually established and regulated, during normal operation, in response to the temperature of the rectifier; and Fig. 4 diagrammatically illustrates a further modified embodiment of the present invention in which the flow of current is gradually established and is also regulated in response to the pressure within the rectifier.

Each of the figures of the drawings shows a different combination of different control elements but it will be understood that elements taken from different figures may be combined to form a system without departing from the spirit of the invention.

Referring more particularly to the drawings by characters of reference, reference number 6 designates an alternating current line of any number of phases operating at any suitable voltage and frequency and herein represented as a three phase line. Assuming that current received from line 6 is to be converted into direct current to be supplied to a direct current line having a negative conductor 7 and a positive conductor 8. To obtain this effect, line 6 is connected with the primary winding 9 of a transformer having a secondary winding 11 comprising a plurality of star connected phase displaced portions forming a neutral point connected with conductor 7. The several portions of winding 11 are severally connected with the anodes 12 of an electron discharge device 13 of any suitable type having a cathode 14 connected with conductor 8. Device 13 is provided with the usual discharge igniting and maintaining means (not shown) and with any other auxiliary equipment necessary for the operation thereof such as the well known cooling and evacuating means, which are not directly affected by the system illustrated in Fig. 1 and are therefore not shown in such figure. Discharge device 13, which will hereinafter be referred to as rectifier 13 for the sake of brevity, is provided with suitable discharge controlling means such as control electrodes 16 severally associated with the anodes 12. Each control electrode 16 is connected through a resistor 17 with one of the star connected phase displaced portions of the secondary winding 18 of a control transformer having a primary winding 19 energized from line 6 through reactors 21. The operation of control electrodes 16 is regulated by means of a regulator generally designated by numeral 22 and comprising a plurality of star connected variable resistors 23 severally connected with the terminals of winding 19. The amount of resistance of resistors 23 in circuit is automatically adjusted in response to the flow of current through winding 9 by means of a current transformer 24 connected with the windings of a torque producing element 26 which effects the displacement of the movable connections of resistors 23 against the action of a spring 27. The windings of torque element 26 are shunted by resistors 28, 29 and 31. The flow of current through rectifier 13 is preferably initiated by closure of a circuit breaker 32 connecting cathode 14 with conductor 8. Such circuit breaker is provided with auxiliary contacts 33 controlling the connection of a suitable source of current such as a battery 34 with the coil of a time delay relay 35 operable to short circuit resistor 28. Relay 35 also controls the connection of battery 34 with the coil of a second time delay relay 36 operable to short circuit resistor 29.

As a result of the above connections, rectifier 13 constitutes the current conductive means and, more particularly, the electron discharge means to be controlled, control electrodes 16 constitute the discharge controlling means and regulator 22 regulates the flow of current through the discharge means in response to an electrical condition of the system which, in the present embodiment, is the magnitude of the flow of current in winding 9. Assuming that the arc igniting and maintaining means have operated, the flow of current through the discharge means to a load (not shown) is initiated by means of circuit breaker 32. Relays 35 and 36 operate in response to an operating condition of the system other than an electrical condition thereof, such condition being the movement of circuit breaker 32, for automatically controlling the flow of current through rectifier 13. Such flow of current is limited, in time, at increasing values following closure of circuit breaker 32 by varying the adjustment of regulator 22 in time to vary the action thereof. Relays 35 and 36 are directly controlled by circuit breaker 32 to progressively establish the flow of current upon operation of the circuit breaker.

In operation, therefore, line 6 being energized and the system being in the position shown in Fig. 1, closure of circuit breaker 32 will cause the flow of current from line 6 through rectifier 13 to line 7, 8 provided that the voltages of winding 18 are of the proper magnitudes and phases relative to the voltages of winding 11 as is well known in the art. Such flow of current causes current transformer 24 to supply a corresponding current to the windings of torque element 26, a minor portion of such current flowing through resistors 28, 29 and 31. If the load connected with line 7, 8 is such as to initially draw a current having a magnitude below a predetermined limit, no operating trouble is to be expected from the flow of such current through rectifier 13 and regulator 22 is therefore so adjusted as to remain in the position shown, thus leaving the flow of current through rectifier 13 unregulated. If the flow of current through rectifier 13 exceeds such predetermined limit, the torque of element 26 overcomes the torque of spring 27 to cause a displacement of the connections of resistors 23. Such resistors are then partially short circuited and receive, from line 6, an increasing amount of current which flows through reactors 21 and cause an increasing reactive voltage drop to occur therein. Such increased leading voltage drop causes the voltages of windings 19 and 18 to lag, thereby retarding the times of positive energization of control electrodes 16 with respect to cathode 14 in the voltage cycle of line 6, and causing the flow of current through rectifier 13 to be decreased as is well known. Such action continues until the flow of current is regulated to the predetermined desired value and the regulator thereafter remains in the position reached thereby until change of load causes further regulating operation of the regulator to maintain the flow of current at the predetermined value. Closure of circuit breaker 32 also causes the coil of relay 35 to be energized from battery 34 through contacts 33 and, after a predetermined period of time, relay 35 short circuits resistor 28. The windings of torque element 26 thereupon receive a lesser portion of current from transformer 24 and regulator 22 will therefore regulate the flow of current through rectifier 13 to a correspondingly greater value. Operation of relay 35 also energizes the coil of relay 36 and, after another predetermined length of time, relay 36 short circuits resistor 29, thereby causing a still lesser portion of the current of current transformer 24 to flow through the coils of torque element 26. The flow of current through rectifier 13 is then adjusted to the value desired for normal operation at which value it is thereafter constantly maintained, and the starting operation is then terminated. If, however, the current taken by the load is less than the predetermined value, the regulator is ineffectual but remains operable to limit such current to the predetermined value when changes in load condition cause the flow of such current to increase.

In the embodiment illustrated in Fig. 2, the action of control electrodes 16 is regulated by a modified regulator 37 provided with a resistor 38 having a movable tap actuated by a torque element 39 and acting against spring 27. Resistor 38 is connected with conductor 7 through a rheostat 41 and with cathode 14 through a resistor 42. Resistors 38 and 42 and rheostat 41 constitute an adjustable voltage divider by means of which a variable portion of the voltage of line 7, 8 is impressed between cathode 14 and the neutral point of winding 18 by the connection of such neutral point with the movable tap of resistor 38. Such neutral point may also be connected with cathode 14 through a capacitor 43 for the purpose of reducing the harmonic alternating current voltage components resulting from the flow of alternating current components through resistors 42 and 38. The armature of torque element 39 is provided with a coil 44 connected in series with a rheostat 46 between conductor 7 and cathode 14. The field of torque element 39 is provided with a voltage coil 47 connected with conductor 7 through a rheostat 48 and with a current coil 49 connected with one terminal of a shunt 52 receiving the current flowing through cathode 14. In the present embodiment, contacts 33 control the connection of battery 34 with a limit switch 53 and with one field coil 54 and the armature 56 of a motor 55. Circuit breaker 32 is provided with a second pair of contacts 57 controlling the connection of battery 34 with a resistor 58, a second limit switch 59, a second field coil 61 and the armature 56 of motor 55. Field coils 54 and 61 are so wound as to cause motor 55 to rotate in the one or in the other direction upon closure of contacts 33 or 57. Motor 55 drives the arm 60 of a rheostat 62, such arm controlling the limit switches 53 and 59 to cause motor 55 to stop when such arm has reached the one or the other extreme position. In the position shown, arm 60 completes a circuit comprising shunt 52, rheostat 62, a manually adjusted rheostat 51 and coil 49. In the extreme position opposite to that illustrated, arm 60 opens such circuit and connects coil 47 with cathode 14.

In the present embodiment, the elements which were already illustrated in Fig. 1 retain their respective functions and, in addition, regulator 37 generally performs, in a modified manner, the functions of regulator 22; rheostat 62 performs in a modified manner the functions of relays 35 and 36.

In operation, energization of line 6 and closure of circuit breaker 32 result in a flow of current through rectifier 13 as above described with reference to Fig. 1. Current then flows through coil 44 in proportion to the voltage of line 7, 8 and another current flows through coil 49 in proportion to the intensity of the current flow through rectifier 13, so that regulator 37 responds to the magnitude of the power output of rectifier 13 and tends to maintain such output at a predetermined constant value, except when the power flowing through rectifier 13 is limited by the load to less than such predetermined value. If such output increases above such value, torque element 39 causes displacement of the movable tap of resistor 38 to increase the portion of resistor 38 inserted between cathode 14 and the neutral point of winding 18. The direct current voltage component impressed between cathode 14 and such neutral point increases accordingly, thereby causing the flow of current through rectifier 13 to decrease as is well known in the art. Such action continues until the output of rectifier 13 is adjusted to the desired value, and regulator 37 then remains in the position reached thereby until a change of load causes a further regulating action of regulator 37.

Closure of circuit breaker 32 causes closure of contacts 33 which establishes connection of motor 55 with battery 34 thereby setting motor 55 in motion to bring arm 60 of rheostat 62 from the extreme position shown to the other extreme position. During such operation, the resistance of the circuit including coil 49 is therefore progressively increased, thereby gradually increasing the value of the power output of the rectifier which regulator 37 tends to maintain. When the entire rheostat 62 is inserted in circuit with coil 49, arm 60 also effects connection of coil 47 with cathode 14 and thereafter opens the circuit of coil 49. Regulator 37 thus reconnected is then responsive only to the magnitude of the voltage of line 7, 8 and regulates the flow of current through rectifier 13 to maintain such voltage at a predetermined constant value. Continued motion of motor 55 causes arm 60 to open switch 53, thereby deenergizing motor 55 which then stops. When circuit breaker 32 is opened, contacts 33 are also opened and contacts 57 are closed, thereby connecting motor 55 with battery 34 in a manner such as to cause motor 55 to return arm 60 into the position shown. In general, rectifier 13 would remain in favorable operating condition for a considerable period of time after interruption of the flow of current therethrough, so that upon reclosure of circuit breaker 32 after a short interruption of the flow of current, it is not necessary to reestablish such flow as slowly and gradually as when rectifier 13 is started after an extended interruption. By inserting resistor 58 in the circuit as shown in the drawings, the return movement of arm 60 to the position shown requires a longer period of time than is necessary for such arm to reach the other extreme position during starting. If circuit breaker 32 is opened for a short period of time, upon reclosure of such circuit breaker, arm 60 will therefore be in an intermediate position and the restarting operation of rectifier 13 will therefore be of reduced duration.

In the embodiment illustrated in Fig. 3, the regulation of the flow of current is again obtained by means of regulator 37 in which, however, coil 47 is then omitted, and coils 44 and 47 are connected in series. Arm 60 is again connected with cathode 14 and controls the connection of a modified rheostat 65 having both terminals thereof connected with coil 47, to regulate the flow of current through such coil during starting operation and also during normal operation of the rectifier. In the present embodiment, rectifier 13 is shown as provided with the usual cooling passages 64 through which a flow of cooling liquid is obtained by suitable means such as a pump 66 driven by a motor 67 preferably energized from line 6 through contacts 33. The cooling fluid thus circulated is cooled by any suitable means such as radiator coil 69. The action of regulator 37 is controlled in response to the temperature of rectifier 13 by means of a suitable temperature responsive device inserted at a suitable point in rectifier 13 or in the cooling circuit thereof. Such device may be a bimetallic strip 71 in contact with the cooling fluid issuing from passage 64 and provided with two insulated contacts 72 and 73 operable to selectively engage with arm 60 of rheostat 65.

In the present embodiment, the functions performed by the several elements already illustrated in Fig. 2 remain generally the same as in such figure, except that the operation of rheostat 65 is now obtained in response to the thermal conditions of rectifier 13 and that such rheostat is not directly controlled by closure of circuit breaker 32. As will appear from a description of the operation of the embodiment in Fig. 3, however, the system of such embodiment also controls the flow of current through rectifier 13, in time, at increasing values upon closure of circuit breaker 32.

In operation, upon energization of line 6 and closure of circuit breaker 32, a flow of current is established through rectifier 13 as above described to thereby energize line 7, 8. The resistance of the circuit of coils 47 and 44, being at a minimum value due to direct connection of arm 60 with coil 47, energization of line 7, 8 produces, through coil 47, a flow of current such as to immediately cause regulator 37 to move into the extreme position opposite to the position shown. The direct current voltage component impressed between cathode 14 and the neutral point of winding 18 is thereby made a maximum and the flow of current through rectifier 13 is reduced to an extent such that the voltage of line 7, 8 is reduced to a predetermined value. Continued operation of rectifier 13 causes the temperature of the fluid circulating through passage 64 to gradually increase, thereby causing gradual deformation of bimetallic strip 71. Such deformation causes contact 73 to engage with arm 60, thereby closing a circuit from battery 34 through arm 60, contact 73, switch 53 and field coil 54 and armature 56 of motor 55. Motor 55 then rotates and causes arm 60 to engage with the upper portion of rheostat 65, thereby increasing the resistance of the circuit of coils 47 and 44, such action continuing until arm 60 disengages contact 73. The circuit of motor 55 is then opened and the motor then stops. As a result of such operation, regulator 37 regulates the flow of current through rectifier 13 in a manner such that the voltage of line 7, 8 is then temporarily maintained at a predetermined value higher than the value of such voltage maintained immediately upon closure of circuit breaker 32. Upon further continued operation of rectifier 13, contact 73 will again engage with arm 60 to cause further adjustment of rheostat 65 to again vary the action of regulator 37. Such regulating action is repeated until rectifier 13, reaching a constant temperature, causes bimetallic strip 71 and arm 60 to remain stationary. If circuit breaker 32 is opened or if the load carried by rectifier 13 decreases, bimetallic strip 71 tends to return to its original shape and causes engagement of contact 72 with arm 60, thereby energizing motor 55 to return arm 60 toward the position shown. The motion of arm 60 may again be effected in steps controlled by successive disengagements and reengagements of contacts 72 with arm 60, and ceases when rectifier 13 reaches a constant lower temperature or when arm 60 opens limit switch 59.

It may be desired to leave the adjustment of regulator 37 constant when the temperature of the rectifier is within a predetermined range obtained during continued flow through the rectifier of all or of a substantial portion of the current which the rectifier is operable to carry, for the reason that the rectifier is then in the proper condition of temperature for carrying such currents without disturbance. Rheostat 65 may accordingly be provided with a portion of no appreciable resistance 70 engaging with arm 60 when thermostat 71 is at any temperature within such predetermined range. Deformations of bimetallic strip 71 and resulting motion of arm 60 are then without effect on the resistance of the circuit of coil 47 and 44. If the temperature of rectifier 13 increases beyond the permissible limit, further deformation of bimetallic strip 71 will cause arm 60 to engage with the lower portion of rheostat 65. Such action decreases the effective resistance of the rheostat in the circuit of coils 47 and 44. As a result of such action, regulator 37 controls the flow of current through rectifier 13 to maintain the voltage of line 7, 8 at a lower value, and thereby tends to reduce the current intensity through rectifier 13. Such action continues until the temperature of rectifier 13 becomes constant or until arm 60 opens limit switch 53.

In the embodiment illustrated in Fig. 4, rectifier 13 is shown provided with suitable evacuating means such as a pump 74 driven by a motor 76 preferably energized from line 6 through contacts 33. The present system is made responsive to the value of the gas pressure in rectifier 13 by means of the well known Wheatstone bridge comprising two resistors 78 and 79 arranged in a gastight chamber communicating with the rectifier chamber, and two other resistors 81 and 82 arranged in air at atmospheric pressure. One diagonal of the bridge receives current from battery 34 and the other diagonal is connected with one coil 83 of a relay 84 of the balance type. Relay 84 is provided with a second coil 86 receiving a variable portion of the voltage of battery 34 through a rheostat 97 in series with a voltage divider 89 having the arm 90 thereof controlled jointly with the arm 60 of rheostat 62.

In the present embodiment the functions performed by the control elements already illustrated in Fig. 3 remain generally the same, except that rheostat 62 operates in response to pressure conditions of rectifier 13. In the present embodiment also the flow of current through rectifier 13 is controlled, in time, at increasing values upon closure of circuit breaker 32 although rheostat 62 is not directly controlled by such circuit breaker.

In operation, line 6 being energized, upon closure of circuit breaker 32 the flow of current through rectifier 13 is initiated. Closure of contacts 33 causes energization of motor 76 which starts and drives pump 74. In general the pressure within rectifier 13 will be comparatively high at the time of closure of circuit breaker 32 due to the previous inoperation of pump 74. Even after a period of continued operation of rectifier 13, if circuit breaker 32 was opened to clear a disturbance such as a short circuit or a backfire, the amount of gases present in rectifier 13 will be comparatively high as a result of the momentary flow of excessive current through the rectifier. In addition, if the rectifier is assumed to be receiving its initial loading as in the so-called forming operation, initiation of flow of current therethrough will immediately result in liberation of a large amount of gases therein which make it necessary to progressively regulate the load carried by the rectifier.

Under such conditions of comparatively high gas pressure in rectifier 13, the current flowing through coil 83 is comparatively low. Arm 60 being in the position shown in the drawings causes the highest possible portion of the voltage of line 7, 8 to be impressed between cathode 14 and the neutral point of winding 18, thereby regulating the flow of current through rectifier 13 in a manner such as to cause the voltage of line 7, 8 to vary with the load in accordance with a predetermined characteristic curve of minimum values. Upon decrease of the pressure within rectifier 13 due to continued action of pump 74, the current through coil 83 increases and the attraction of coil 83 on the armature of relay 84 overcomes the attraction of coil 86, thereby causing the armature to close contact 88. A circuit is thereby closed from battery 34 through contact 88, switch 53 and field coil 54 and armature 56 of motor 55. Motor 55 starts and drives arm 60 of rheostat 62, thereby decreasing the direct current voltage component impressed between cathode 14 and neutral point of winding 18 and causing the voltage of line 7, 8 to follow a characteristic curve of higher values. Motor 55 also drives arm 90 of rheostat 89 thereby increasing the voltage impressed on coil 86. Such action continues until the combined attractions of coils 83 and 86 on the armature of relay 84 cause contact 88 to reopen, thereby causing motor 55 to stop. Such action is repeated until the pressure within rectifier 13 is decreased to a constant value or until arm 90 opens limit switch 53, the voltage of line 7, 8 then being no longer regulated. Upon increase in the pressure within rectifier 13 due to the unavoidable leakage occurring over periods of inoperation or due to the liberation of gases resulting from the flow of current through the rectifier, the current through coil 83 decreases and the action of coil 86 overcomes that of coil 83 to cause the armature of relay 84 to close contacts 87. Motor 55 is thereby energized to return arms 60 and 90 toward the position shown, such action continuing until the flow of current through coil 86 is decreased by movement of arm 90 to an extent such as to cause reopening of contact 87. The flow of current through rectifier 13 is then again regulated in accordance with a lower characteristic curve. Such action is repeated until the pressure within rectifier 13 reaches a constant higher value or until arm 90 opens switch 59.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In a system for controlling the flow of electric current, electron discharge means to be controlled, and means responsive to a pressure condition of the first said means for causing the flow of current therethrough to be progressively varied.

2. In a system for controlling the flow of electric current, electron discharge means to be controlled, means for controlling the initiation of flow of current through said discharge means, means responsive to an electrical condition of said system for regulating the flow of current through said discharge means, and means comprising an element of the second said means and controlled thereby for varying the adjustment of the third said means to progressively vary the action thereof at a predetermined rate independent of the rate of movement of the second said means.

3. In a system for controlling the flow of electric current, electron discharge means to be controlled, discharge controlling means for said discharge means, means responsive to an electrical condition of said system for controlling the second said means, means for controlling the initiation of flow of current through said discharge means, and means comprising an element of the fourth said means and operable thereby to progressively vary the action of the third said means at a predetermined rate independent of the rate of movement of the fourth said means.

4. In combination with an electron discharge device having a cathode and an anode constituting electrodes for the flow of current therebetween, of means comprising a control electrode associated with said anode operable to regulate the magnitude of said flow of current, and means responsive to a thermal condition of said device for controlling the said operation of the first said means.

5. In combination with an electron discharge device having a cathode and an anode constituting electrodes for the flow of current therebetween, of means comprising a control electrode associated with said anode operable to cause said flow of current to be progressively varied, and means responsive to a pressure condition of said device for controlling the said operation of the first said means.

6. In an electric current conversion system, the combination of an electron discharge device comprising a cathode, an anode constituting with said cathode electrodes for the flow of current therebetween, and a control electrode associated with said anode operable to cause said flow of current to be progressively varied, and means operable responsive to an operating condition of said system for controlling the said operation of the said control electrode in such sense as to cause the magnitude of said current to be progressively increased at a predetermined rate independent of the rate of movement of said means.

7. In an electric current conversion system, discontinuously controllable electron discharge means, means for controlling the initiation of flow of current through the first said means and for causing the flow of said current to be progressively increasingly varied at a predetermined rate, and means operable responsive to an operating condition of said system for controlling the said flow of current through the first said means.

8. In an electric current conversion system, discontinuously controllable electron discharge means, means for controlling the initiation of flow of current through the first said means, and current responsive means operable responsive to variations in the magnitude of the current flowing through said device and controlled by the second said means for causing the said flow of current to be progressively increased at a predetermined rate.

9. In an electric current conversion system, an electron discharge device, means operable to one position thereof to control thereat the initiation of flow of current through said device and operable to another position thereof to cause interruption of said current, means comprising an element of said device for controlling the operation thereof in such sense as to cause the magnitude of said current to be varied, means operable from one to another position thereof to affect the operation of the second said means in such sense as to cause the magnitude of said current to be progressively increased at a predetermined rate, and means operable responsive to operation of the first said means to the said one position thereof to cause said operation of the third said means and operable responsive to said operation of the first means to the said another position thereof to cause operation of the third said means to the said one position thereof.

10. In an electric current conversion system, an electron discharge device, means operable to one position thereof to control thereat the initiation of flow of current through said device and operable to another position thereof to cause interruption of said current, means comprising an element of said device for controlling the operation thereof in such sense as to cause the magnitude of said current to be varied, means operable from one to another position thereof at such a rate as to affect the operation of the second said means in such sense as to cause the magnitude of said current to be progressively increased at a predetermined rate, and current responsive means operable responsive to operation of the first said means to the said one position thereof to cause said operation of the third said means.

11. In an electric current conversion system, an electron discharge device, means operable to one position thereof to control thereat the initiation of flow of current through said device and operable to another position thereof to cause interruption of said current, means comprising an element of said device for controlling the operation thereof in such sense as to cause the magnitude of said current to be varied, means movable from one to another position thereof at such a rate as to affect the operation of the second said means in such sense as to cause the magnitude of said current to be progressively increased at a predetermined rate, and means operable responsive to operation of the first said means to the said one position thereof to cause said movement of the third said means and operable responsive to operation of the first said means to the said another position thereof to cause movement of the third said means to the said one position thereof at a predetermined rate differing from the said rate of movement thereof to the said another position thereof.

12. In an electric current conversion system, an electron discharge device comprising an anode and a cathode constituting spaced electrodes for the flow of current therebetween, means for controlling the initiation of said flow of current, means comprising an element of said device for controlling the said flow of current, means comprising an element responsive to said flow of current for affecting the action of the second said means in such sense as to cause said current to be maintained at substantially constant magnitude, and current responsive means operable responsive to said operation of the first said means for affecting the action of the third said means in such sense as to cause said current to be progressively increased at a predetermined rate.

13. In an electric current conversion system, the combination with an electric current supply circuit, a load circuit, an electron discharge device comprising an anode and a cathode interconnecting said circuits and constituting spaced electrodes for the flow of current between said circuits, and means controlling the initiation of said flow of current, of means comprising an element of said device for controlling the magnitude of said current, means comprising an element responsive to said flow of current for controlling the said action of the second said means, and current responsive means operable responsive to operation of the first said means for affecting the operation of the third said means in such sense as to cause the magnitude of said current to be progressively increased at a predetermined rate.

14. In an electric current conversion system, the combination with an electric current supply circuit, a load circuit, an electron discharge device comprising an anode and a cathode interconnecting said circuits and constituting spaced electrodes for the flow of current between said circuits, and means controlling the initiation of said flow of current, of means comprising a control electrode of said device for controlling the magnitude of said current, means comprising an element responsive to the flow of said current in one of said circuits for controlling the said action of the second said means, and current responsive means operable responsive to operation of the first said means for affecting the action of the third said means in such sense as to cause the magnitude of said current to be progressively increased at a predetermined rate.

15. In an electric current conversion system, the combination of an electric current supply circuit, a load circuit, an electron discharge device comprising an anode and a cathode interconnecting said circuits and constituting spaced electrodes for the flow of current between said circuits, means comprising an element of said device for controlling the magnitude of the voltage of said load circuit, and means operable responsive to an operating condition of said system for controlling the said operation of the first said means in such sense as to cause the magnitude of the said voltage to be progressively increased at a predetermined rate.

16. In an electric current conversion system, the combination of an electric current supply circuit, a load circuit, an electron discharge device comprising an anode and a cathode interconnecting said circuits and constituting spaced electrodes for the flow of current between said circuits, means comprising an element of said device for controlling the magnitude of the voltage of said load circuit, means for controlling the operation of the first said means comprising elements respectively responsive to variations of the current and of the voltage of said load circuit, and means for affecting the operation of the second said means in such sense as to thereby cause the first said means to operate in such manner as to cause the magnitude of the power output of said device to be progressively increased.

17. In an electric current conversion system, the combination of an electric current supply circuit, a load circuit, an electron discharge device comprising an anode and a cathode interconnecting said circuits and constituting spaced electrodes for the flow of current therebetween, means for initiating the said flow of current, means comprising an element of said device for controlling the magnitude of the voltage of said load circuit, means for controlling the operation of the second said means comprising elements respectively responsive to the magnitude of the current and the voltage of the said load circuit, and means operable responsive to operation of the first said means for affecting the operation of the third means in such sense as to thereby cause the operation of the second said means to be modified in such sense as to cause the magnitude of the power output of the said device to be progressively increased at a predetermined rate.

HAROLD WINOGRAD.